United States Patent Office 2,801,537
Patented Aug. 6, 1957

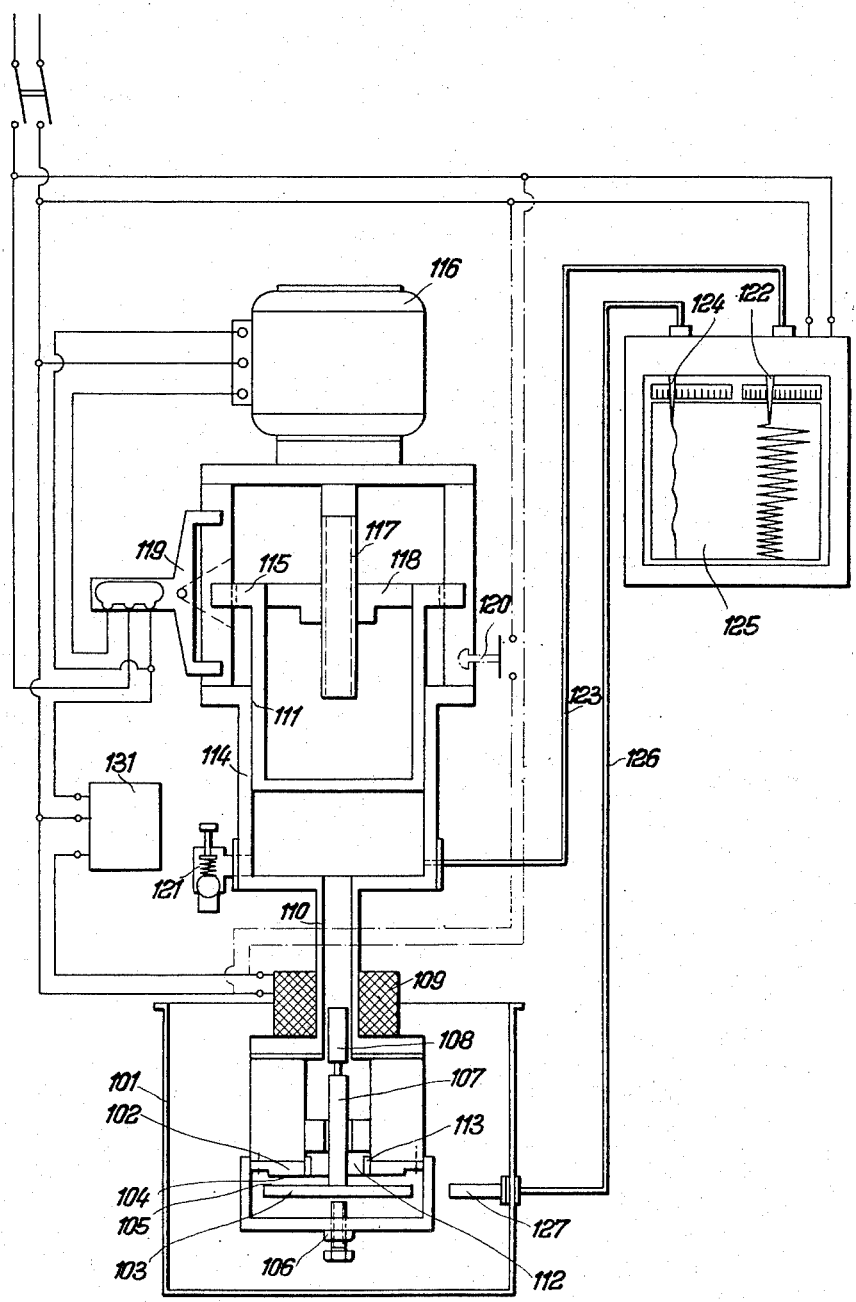

2,801,537
APPARATUS FOR TESTING THE STICKING PROPERTIES OF LIQUIDS

Hans Kabelitz, M. Gladbach, Rhineland, Germany, assignor to Gebruder Sucker G. m. b. H., M. Gladbach, Rhineland, Germany Application May 6, 1953, Serial No. 353,351

Claims priority, application Germany May 8, 1952

2 Claims. (Cl. 73—58)

The present invention relates to a testing apparatus for determining the sticking properties of liquids.

In many industries such an apparatus is very desirable. For example, in the processing of textiles, before the textile fibers arrive at the loom, they are located in a bath of water to which starch is added for increasing the stickiness of the water so as to lend to the fibres properties which make it much easier to handle the same in the further textile processing. When such a starch is added to the water and the water is heated the starch reacts with the water to increase the sticking properties thereof, and there is a predetermined optimum point beyond which the sticking properties deteriorate. The reason for this is that if the starch and water are heated for too long a period of time, hydrolization takes place and the starch turns to sugar. Therefore, it is very desirable to have an apparatus for determining the exact moment when the sticking properties of the solution are at a maximum.

One of the objects of the present invention is to provide an apparatus capable of accurately determining the sticking properties of a liquid.

A further object of the present invention is to provide an apparatus which determines the sticking properties of a liquid by measuring the force required to separate members which are stuck to a film of the liquid to be tested.

An additional object of the present invention is to provide an automatically opearted apparatus for determining the stickiness of liquids.

Yet another object of the present invention is to provide a means for recording values taken with the apparatus so as to very clearly indicate when the best possible sticking properties are attained.

A still further object of the present invention is to provide a means for signalling when the desired sticking properties are attained.

Also, the objects of the present invention include the provision of a simply and ruggedly constructed apparatus capable of accomplishing all of the above objects and assuring reliable operation for a long period of time.

With the above objects in view the present invention mainly consists of an apparatus for testing the sticking properties of a liquid, this apparatus including a pair of testing members each of which has a testing face, these members being arranged with the testing faces thereof directed toward each other. A support means carries the testing members and mounts at least one of the testing members for movement toward and away from a position where the testing faces are in engagement with each other. A moving means is mounted on the support means for moving this one testing member toward and away from the above-mentioned position thereof, and a force measuring means is operatively connected to the moving means for measuring the force exerted by the moving means to move this one testing member away from the above-mentioned position thereof when a film of liquid to be tested is located between and in engagement with these testing faces of the testing members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows a partly diagrammatic and partly sectional elevational view of an embodiment of the present invention, showing in dot-dash lines a variation of the arrangement shown in the drawing.

The drawing illustrates on embodiment of the invention which is adapted to operate automatically. It will be seen that the apparatus of the invention extends into a tub or vat 101 carrying the liquid to be tested. The testing member 102 is provided with a central opening 112 and is fixed to the bottom end of a cylindrical member located in this tub as shown in the drawing. The testing member 103 is located opposite and beneath the testing member 102, the latter testing member having a bottom testing face 104 while the testing member 103 has a top testing face 105.

A substantially U-shaped bracket is carried by the cylinder to which the testing member 102 is connected, and this bracket is supported in any known way (not shown) in spaced relation from the bottom of the vat 101. A screw member 106 passes through this U-shaped bracket and supports the movable testing member 103 which has an elongated rod portion 107 fixed to its top face and extending through the opening 112 of testing member 102 into the cylinder carrying the latter.

A ferrous solenoid core portion 108 is connected to the top end of the rod portion 107 and extends into the interior of an elongated tube 110 which is made of any non-magnetic material such a plastic, brass, copper or the like, this non-magnetic tube 110 communicating with the interior of the cylinder carrying testing member 102 and being fixed to this cylinder. Also, this cylinder is provided with a suitable guide means which slidably engages the rod portion 107 to guide the latter for vertical reciprocating movement together with the movable testing member 103. A solenoid coil 109 is wound around the tube 110, and, as is shown in the drawing, the core portion 108 extends partly into the space about which the coil 109 is located. Rings 113 are adapted to be supported in any known way in the central opening 112 of member 102, as by being threaded to this member 102, so as to control the size of the opening at the center of member 102 which is located about the rod portion 107.

The top end of the tube 110 carries and communicates with the interior of a second cylinder 114. A piston 111 is mounted for sliding reciprocating vertical movement in the cylinder 114 and the top end 115 of piston 111 carries and is fixed to a plate 118 formed with a threaded opening through which the screw member 117 extends in threaded engagement with the plate 118. The cylinder 114 is provided with an upwardly extending bracket which carries a motor 116 operatively connected to the screw member 117 for rotating the latter in opposite directions so as to raise and lower the piston 111. This bracket pivotally supports a mercury switch 119 which is adapted to be actuated by a projecting portion of the top end 115 of piston 111 to be tilted in opposite directions for reversing the direction of rotation of the motor 116, this switch 119 being a mercury switch and being electrically interconnected with the motor 116 and with a source of current, as shown in the drawing.

A wiper relay 131 is also electrically interconnected with the switch 119 for energizing the coil 109 when the piston 111 is located at or just before the bottom of its stroke. Instead of this wiper relay, however, a switch 120 may be provided, as shown in dot-dash lines, to be actuated by another projecting portion of piston 111 for closing the circuit to coil 109 when the piston 111 is located substantially at the bottom of its stroke.

A spring-pressed inlet valve 121 is mounted on the cylinder 114 and communicates with the interior thereof, this inlet valve 121 being adjustable, as is diagrammatically shown, so as to adjust the minimum pressure which can be provided within the cylinder 114. Thus, when the pressure in cylinder 114 descends to a predetermined value the valve 121 will automatically open and admit air to the cylinder. A gas pressure measuring apparatus 122 communicates with the interior of the cylinder 114 through the duct 123, and a temperature measuring apparatus 124 communicates with the interior of the vat 101 through the line 126 which communicates with a support 127 located in the vat for carrying a thermometer to give a temperature indication. The indication of temperature and pressure are simultaneously produced on the roll of paper 125 which continuously moves downwardly, as viewed in the drawing, to receive markings from writing instruments connected to the pointers of the pressure measuring apparatus 122 and temperature measuring apparatus 124.

The above-described apparatus operates as follows:

With the apparatus located partly in a vat, as shown, the liquid of the vat will be in constant engagement with the testing faces 104 and 105. Assuming that when the motor 116 is turned on the screw 117 is rotated to move the piston 111 downwardly, this piston will compress air in the cylinder 114, and this air will pass downwardly along the tube 110, through the cylinder carrying testing member 102, through the opening 112 thereof, and will bubble along the testing faces 104 and 105 so as to clean these testing faces. Thus, the apparatus provides a means for automatically cleaning the testing faces during each downward stroke of the piston 111.

At the bottom of the stroke of the piston, either the switch 120 is closed or the relay 131 is actuated to energize the coil 119 which suddenly pulls the core portion 108 upwardly so as to move the testing member 103 toward the testing member 102, and a film of the liquid to be tested will be located between and in contact with the testing faces 104 and 105. The upward movement of the piston 111 produces a suction force against the testing member 103 to compress the film located against faces 104 and 105, and the inlet valve 121 regulates the maximum compressive force which is applied against this film. At the top of the stroke of the piston 111, the projection extending from the top end 115 thereof actuates switch 119 to reverse the motor 116 so as to reverse the direction of rotation of screw 117 and the piston 111 is lowered so as to compress air in the cylinder 114. It will be noted that the coil 109 is de-energized upon a slight upward movement of the piston and serves to hold the testing member 103 against testing member 102 for the short period of time required until the suction force in the cylinder 104 is sufficient for this purpose.

The downwardly moving piston 111 constantly compresses air trapped between this piston and the top face of member 103 which covers the opening 112, and this compressed air urges the testing member 103 downwardly away from the testing member 102. This movement of testing member 103 is resisted, however, by the stickiness of the film located against the testing faces 104 and 105, so that the air pressure continually builds up and registers on the apparatus 122.

At the instant when the film between faces 104 and 105 gives way, there is a sudden decrease in pressure which is clearly indicated by a sharp change in direction of the line produced on the roll 125, so that the operator knows at what pressure the film gave way. This air passing between the faces 104 and 105 cleans these faces, as was described above. The above operations are continuously repeated and it is evident that the entire apparatus is fully automatic. Of course, the readings of this apparatus are carefully adjusted so as to compensate for the pressure of the liquid in the vat 101.

It will be understood that each of the elements described above, or two or more together, may also find a useful application in other types of apparatus for testing the sticking properties of a liquid differing from the types described above.

While the invention has been illustrated and described as embodied in automatic apparatus for testing the sticky properties of a liquid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for testing the sticking properties of a liquid comprising, in combination, a pair of testing members each having a testing face and being arranged with said testing faces directed towards each other; support means carrying said testing members and mounting at least one of said testing members for movement toward and away from a position where said testing faces are in engagement with each other; moving means mounted on said support means for moving said one testing member toward and away from said position thereof, the other of said testing members being formed with an opening passing therethrough, said support means comprising a first cylinder having opposite open ends and being fixed at one end thereof to the side of said other testing member opposite from said face thereof, said opening of said other testing member communicating with the interior of said first cylinder, a bracket fixed to said first cylinder and having a portion located opposite said other testing member, an elongated member mounted on said bracket and having a top end supporting said one testing member, a rod fixed to said testing face of said one testing member and extending through said opening of said other testing member into said first cylinder, a solenoid core portion fixed to the top end of said rod, a tube of non-magnetic material located about said core portion, being mounted on said first cylinder, communicating with the interior thereof, and extending upwardly therefrom, a solenoid coil located about said tube and at least partly about said core portion, said coil and core portion forming part of said moving means, and said moving means further including a second cylinder located on said tube and communicating with the interior thereof, a piston slidably engaging the interior of said second cylinder for reciprocating movement therein, a screw member threadedly connected with said piston, a bracket mounted on and extending upwardly from said second cylinder, and a motor mounted on said bracket and being connected to said screw member for rotating the latter to reciprocate said piston, switch means carried by said bracket and being electrically connected to said motor for reversing the same and to said coil for energizing the same, and a projecting portion fixed to and extending from said piston to actuate said switch means during movement of said piston; and force measuring means operatively connected to said moving means for measuring the force exerted by said moving means to move said one testing member away from said position thereof when a film of liquid to be tested is located between and in engagement with said testing faces, said force measuring means comprising a duct communicating with the interior of said second cylinder and a gas pressure measuring apparatus communicating with said duct.

2. An apparatus as defined in claim 1 and wherein a spring-pressed inlet valve means communicates with the interior of said second cylinder to limit the extent to which the pressure in the latter drops, and an adjusting means operatively connected to said inlet valve means for adjusting the pressure at which the latter opens.

References Cited in the file of this patent

UNITED STATES PATENTS

| | | |
|---|---|---|
| 1,398,878 | Michell | Nov. 29, 1921 |
| 1,441,564 | Eberly | Jan. 9, 1923 |
| 1,785,521 | Maekin | Dec. 16, 1930 |
| 2,049,162 | Healy | July 29, 1936 |
| 2,345,968 | Green | Apr. 4, 1944 |

FOREIGN PATENTS

| | | |
|---|---|---|
| 804,153 | France | July 27, 1936 |